United States Patent [19]

Vaughan et al.

[11] Patent Number: 5,318,766
[45] Date of Patent: Jun. 7, 1994

[54] PROCESS FOR PREPARING LTL NANO-CRYSTALLINE ZEOLITE COMPOSITIONS

[75] Inventors: David E. W. Vaughan, Flemington; Karl G. Strohmeier, Port Murray, both of N.J.

[73] Assignee: Exxon Research and Engineering Company, Florham Park, N.J.

[21] Appl. No.: 950,528

[22] Filed: Sep. 25, 1992

[51] Int. Cl.$^5$ ............................................. C01B 33/34
[52] U.S. Cl. .......................... 423/700; 423/DIG. 28; 423/328.1
[58] Field of Search ............... 423/700, 704, DIG. 28, 423/328.1

[56] References Cited

U.S. PATENT DOCUMENTS 4,530,824  7/1985  Arika et al. .......................... 423/700
4,533,649  8/1985  Ball et al. ............................ 423/704

OTHER PUBLICATIONS

Synthesizing Zeolites, Robson, Chemtech, vol. 8, No. 3, Mar. 1978, pp. 176–180.
The Synthesis and Manufacture of Zeolites Vaughan, Chemical Engineering Progress, Feb. 1988, pp. 25–31.

*Primary Examiner*—Carl F. Dees
*Attorney, Agent, or Firm*—Ronald D. Hantman

[57] ABSTRACT

The reaction of premade gels with KOH in aqueous ammonia solvents yields highly crystalline but ultrasmall particulate, colloidal, products having major advantages in catalytic and sorption process.

6 Claims, 4 Drawing Sheets

PROCESS FOR PREPARING LTL NANO-CRYSTALLINE ZEOLITE COMPOSITIONS

BACKGROUND OF THE INVENTION

This invention relates to a novel process for the preparation of nano-crystallite forms of LTL, having crystal sizes less than 30 nano-meters. In particular, the zeolite has a structure of zeolite LTL and is prepared using stoichiometric quantities such that the ratio of product to reactants approaches unity, and the product crystals are less than about 30 nanometers diameter. The use of ammonia as a solvent or co-solvent in the process is essential to achievement of the desired product.

Ammonia is similar to water in that it is a dipolar, protonic solvent capable of acid-base chemistry. It has a dipole moment of $3.4 \times 10^{-30}$ C·m compared to $4.9 \times 10^{-30}$ C·m for the more polar water molecule. This results in ammonia being a poorer solvent than water for ionic substances, but a better solvent for more covalent compounds. At a pH greater than about 9, the equilibrium $NH_4 + OH^- \rightarrow NH_3 + H_2O$ totally favors gaseous ammonia dissolved in the base solution. Pure ammonia has a vapor pressure of over 60 atm at 100° C. compared to 1 atm for pure water. In this invention ammonia either promotes the "flood" nucleation of LTL or poisons the surface of crystals at the nucleus stage of between 100 Å and 200 Å.

A zeolite designated as zeolite L is known to exhibit good catalytic properties, particularly for hydrocarbon conversion, and advantageous sorbent properties as described, for example, by Barrer et al., *Surface Science*, 12, 341 (1968). The chemical composition of zeolite L is disclosed in U.S. Pat. No. 3,216,789 to be:

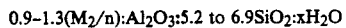

0.9–1.3($M_2/n$):$Al_2O_3$:5.2 to 6.9$SiO_2$:$xH_2O$ where M is an exchangeable cation of valence n and x is from 0 to 9. Zeolite L also has a characteristic x-ray diffraction pattern, and its structure has been determined by Barrer et al., *Zeit. Krist.*, 128, 352 (1969). The structure code LTL has been assigned to this structure type (Atlas of Zeolite Structure Types, 3rd Edn., W. M. Meier and D. H. Olson, Intl. Zeolite Assoc./Butterworths Press (1992)). The x-ray diffraction pattern of zeolite L has the following more significant d(Å) values:

| |
|---|
| 16.1 ± 0.3 |
| 7.52 ± 0.04 |
| 6.00 ± 0.04 |
| 4.57 ± 0.04 |
| 4.35 ± 0.04 |
| 3.91 ± 0.02 |
| 3.47 ± 0.02 |
| 3.28 ± 0.02 |
| 3.17 ± 0.01 |
| 3.07 ± 0.01 |
| 2.91 ± 0.01 |
| 2.65 ± 0.01 |
| 2.46 ± 0.01 |
| 2.42 ± 0.01 |
| 2.19 ± 0.01 |

A typical preparation of Zeolite L as disclosed by Breck, *Zeolite Molecular Sieves*, New York: J. Wiley, 283 (1974) employs an excess of $SiO_2$ and a greater excess of $K_2O$. Isostructural compositions include ECR-2 (U.S. Pat. No. 4,552,731) and BaG-L (Baerlocher & Barrer, Zeit. Krist., v. 36, p. 245, (1972)).

The preparation of zeolite L described in U.S. Pat. No. 3,216,789 involves crystallizing the zeolite from a reaction mixture having a mole ratio of silica to alumina which is significantly higher than the ratio in the formed zeolite. Specifically, the reaction mixture comprises mole ratios:

| | |
|---|---|
| $K_2O/(K_2O + Na_2O)$ | 0.33–1 |
| $(K_2O + Na_2O)/SiO_2$ | 0.35–0.5 |
| $SiO_2/Al_2O_3$ | 10–28 |
| $H_2O/(K_2O + Na_2O)$ | 15–41 |

Zeolite L and zeolites having related structures belong to the "L" family of zeolites. This family is characterized by having a 12-ring hexagonal structure with pore dimensions of about 5.5 to 7.2 Å. In addition to zeolite L there are also barium zeolites Ba-G and Ba-G,L described by Barrer et al in *J. Chem. Soc.*, 2296 (1964), *J. Chem. Soc.*, 1254 (1972) and *J. Chem. Soc.*, 934 (1974); ZSM-10 (U.S. Pat. No. 3,692,470) may be a DABCO containing member of this group of zeolites. Similarly, zeolite UJ (U.S. Pat. No. 3,298,780) may also be of the zeolite L type. Numerous syntheses of zeolite L have been reviewed in U.S. Pat. No. 4,973,461.

Structures have been proposed for zeolite L (Barrer et al, *Zeit. Krist.*, 128, 352 (1969)) and GL (Baerlocher et al, ibid). If all cation positions in L are filled by monovalent cations, L will have a minimum Si/Al ratio of 1.8 according to Baerlocher et al (*Zeit. Krist.*, v. 136, p. 253 (1972)). ECR-2 has an Si/Al composition in this range (U.S. Pat. No. 4,552,731).

Subsequently, several patents have claimed specific morphology LTL products, such as discs (EP 0096479), large cylindrical crystals (U.S. Pat. No. 4,544,539), and microcrystals (U.S. Pat. No. 5,064,630), and the subject of morphology variation and control has been discussed generally by Fajula (NATO ASI Series, v. 221B, p. 53 (1990)).

It has been found that zeolite L may be used as a catalyst base in aromatization reactions. U.S. Pat. No. 4,104,320 discloses dehydrocyclization of aliphatic compounds in the presence of hydrogen using a catalyst comprising zeolite L and a group VIII metal, in which the zeolite L is of the formula:

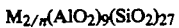

$M_{2/n}(AlO_2)_9(SiO_2)_{27}$ (where M is a cation of valence n), but the silica to alumina ratio may vary from 5 to 7.

East German Patent 88,789 discloses dehydrocyclization using a catalyst formed from a zeolite precursor with a silica to alumina ratio of 5 or greater which is dealuminized to give a silica to alumina ratio of up to 70. Zeolite L is mentioned as a precursor.

European Patent Application Publication 40119 discloses a dehydrocyclization process operating at low pressure (1 to 7 bars) or low $H_2$/hydrocarbon ratio using a catalyst comprising platinum on a potassium zeolite L. Belg. Patent 888,365 describes dehydrocyclization using a catalyst comprising platinum, rhenium (incorporated in the form of its carbonyl) and sulphur to give an atomic ratio of sulphur to platinum of 0.05 to 0.6 on a zeolitic crystalline aluminosilicate base such as zeolite L. Belg. Patent 792,608 discloses the treatment of zeolite L for use as a catalyst in isomerization by exchange with ammonium and chromium ions.

SUMMARY OF THE INVENTION

The present invention is a process to make synthetic nano-sized crystalline zeolites isostructural with LTL, having desirable property advantages because of small crystal sizes, and having the composition, in terms of mole ratios of oxides, in the range:

wherein m represents at least one exchangeable cation of a metal selected from Group I through VIII of the Periodic Table (Kirk-Othmer Encyclopedia of Chemical Tech., 2nd Edn., V. 8, (1965)), n represents the valence of M, and x may be 0 or a number from 1 to about 6.

The steps of the process include:
(a) preparing a reaction mixture comprising water, a source of silica, a source of alumina, KOH and up to about 30 mole percent of NaOH based on total moles of KOH and NaOH, ammonia, the reaction mixture having a composition, in terms of mole ratios of oxides, within the following ranges:

| | |
|---|---|
| $M_2'O:Al_2O_3$ | 2.5 to 8 |
| $SiO_2:Al_2O_3$ | 4 to 20 |
| $H_2O:Al_2O_3$ | 80 to 400 |
| $NH_3:Al_2O_3$ | 30 to 150 | where M' is either K or a mixture of K and Na; and Al may be partly or wholly replaced by Ga; and Fe may replace up to about 30% Al or Ga.

(b) maintaining the reaction mixture at between about 70° C. and 160° C. under autogenous pressure for a sufficient period of time to form a crystalline product in which the crystals have a diameter less than about 30 nanometers.

DESCRIPTION OF THE PREFERRED EMBODIMENT

The present invention is a new way to synthesize LTL in ammonia solvent and co-solvent systems which results in colloid sized crystallites less than 300 Å, and in some cases less than 200 Å in diameter. In hydrocarbon processes such small crystals give high diffusion rates, high reactivities, and exceptional resistance to deactivation by pore plugging and surface contamination. The characteristic X-ray diffraction patterns show very broad peaks, and in some cases near—amorphous spectra. However, their IR spectra are fully characteristic of LTL. Such materials may be expected to have superior performance characteristics in such catalytic reactions as aromatization of normal paraffins, reforming, dewaxing, isomerization and oligomerization, as a result of their enhanced accessibility to the micropores.

These products show exceptionally high micropore capacity for hydrocarbons, together with unusual mesopore capacity characteristic of agglomerated colloidal particles. Nano-crystals of this type are particularly useful for the preparation of inorganic membranes; the micro crystals filling the pores of the ceramic, usually, alumina, titania or silica, supports, so providing a resilient microporous membrane useful for hydrocarbon, catalytic and separation applications.

At this time the preferred way to make these products is to react a premade silica-alumina gel—typically an amorphous fluid cracking catalyst—having an Si/Al ratio between about 4 and 12 in a potassic ammonia or aqueous ammonia solution. In the absence of ammonia entirely different zeolite products such as chabazite and phillipsite crystallize. The preferred reaction composition is:

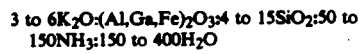

Materials of this invention may be difficult to filter in a conventional way from the mother liquor of waste products, in which case centrifuge separation and washing is a preferred mode of product separation and purification.

EXAMPLE 1

Figure 1:
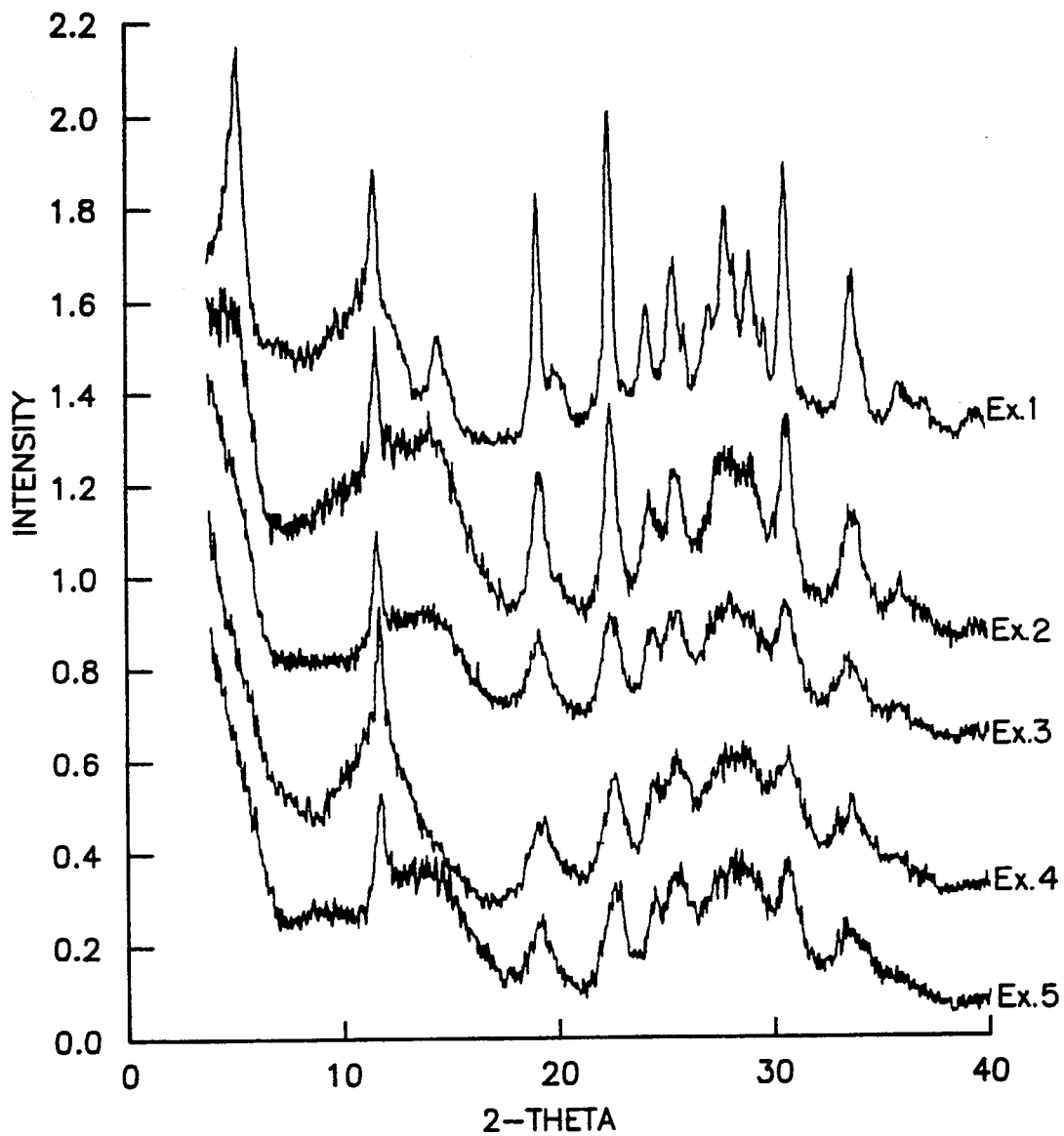
FIG. 1 shows the x-ray diffraction patterns for the materials made in examples 1 (top spectrum) through 5 (bottom spectrum).
Figure 2:
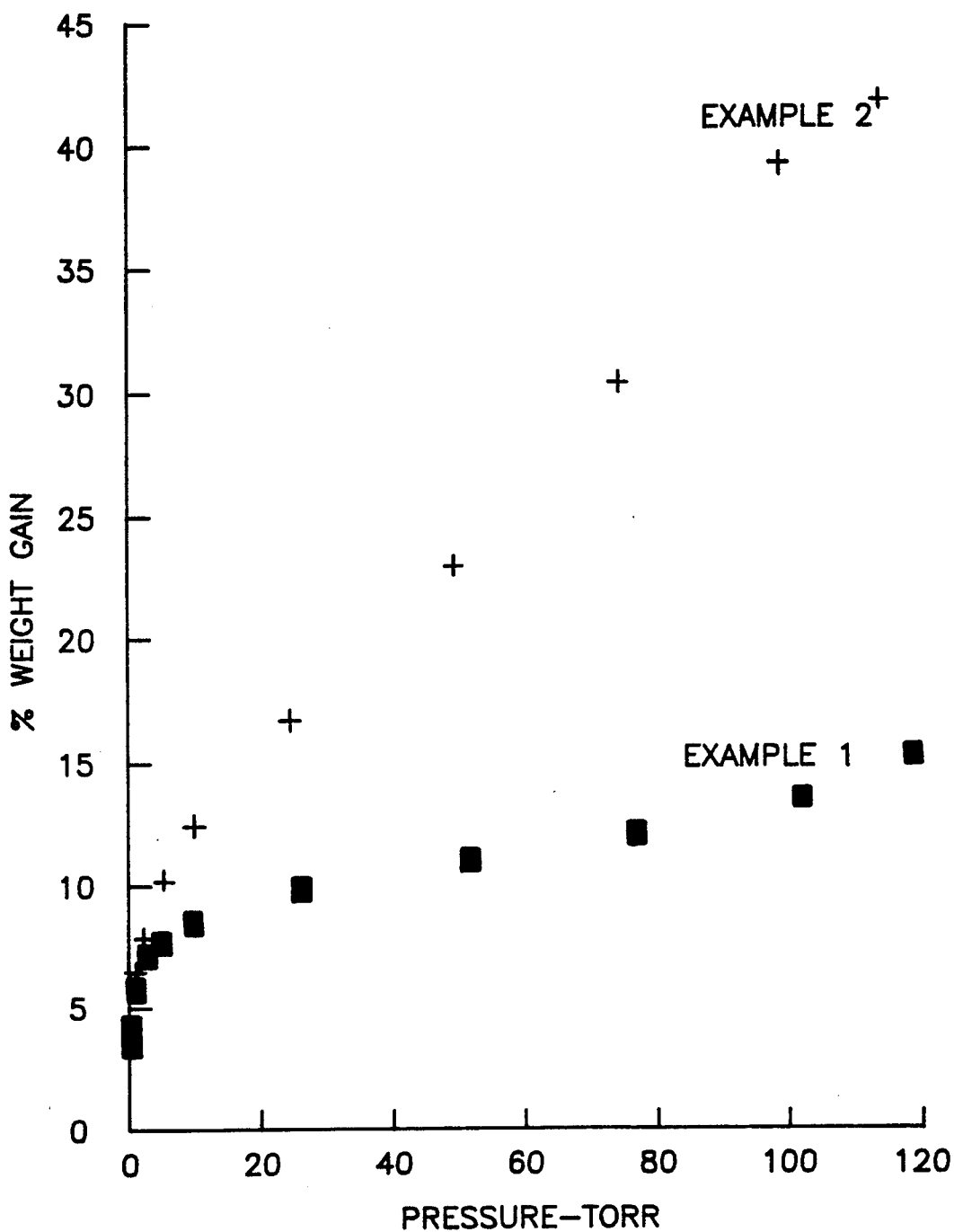
FIG. 2 shows the n-hexane sorption capacity for the zeolites made in examples 1 and 2.
Figure 3:
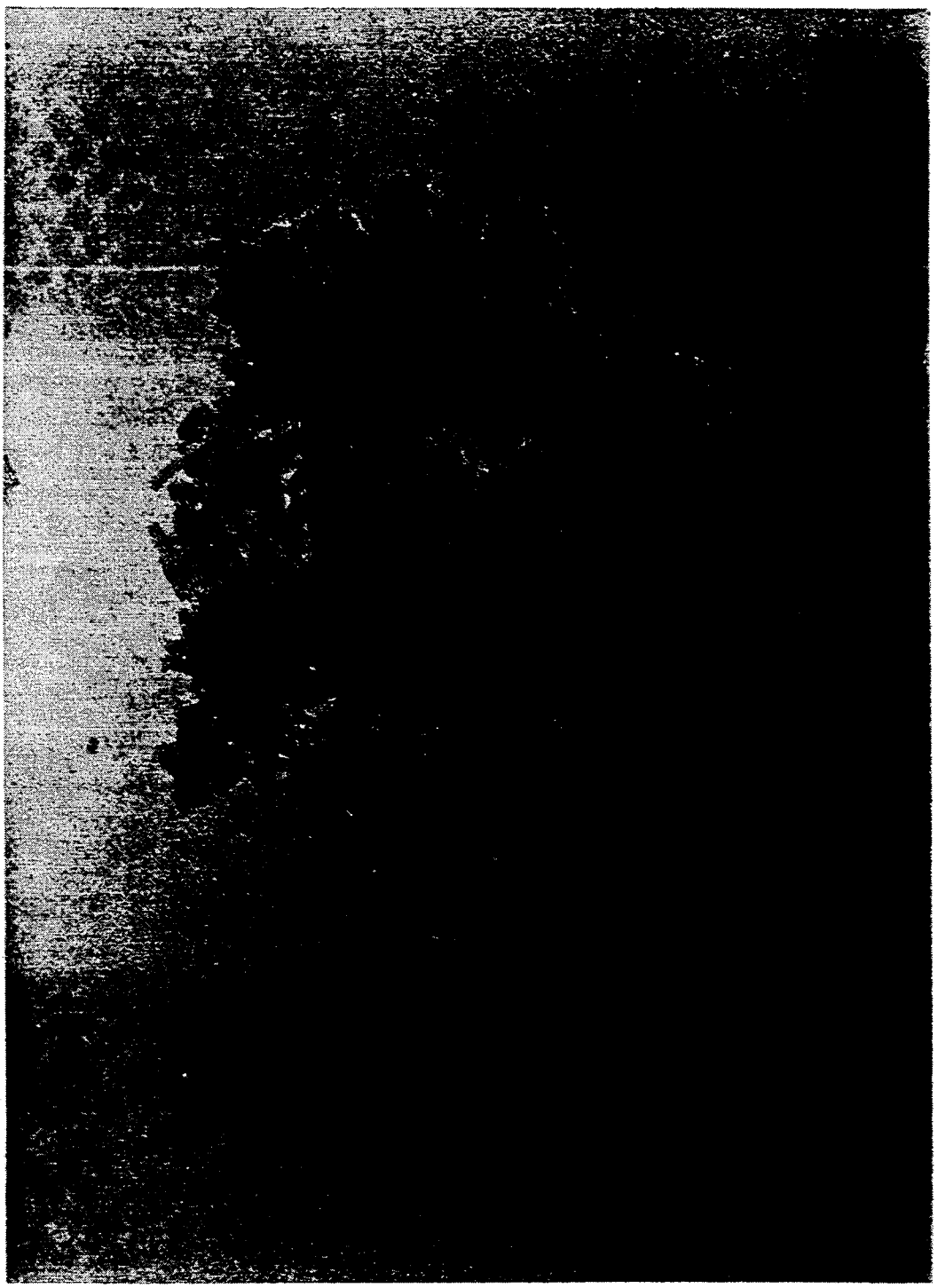
FIG. 3 shows an electron micrograph of the nano-crystals of example 1.

A composition:

was made by mixing 5 gms high alumina fluid cracking catalyst gel (Davison Chemical Co., Hi-Alumina FCC, having a chemical composition of about 12.5 wt % $Al_2O_3$, 87.5 wt % $SiO_2$) in a solution of 2.40 gms KOH.½ $H_2O$ in 40 mls aqueous ammonium hydroxide (29% $NH_3$), and reacting in an autoclave at 100° C. After 12 days reaction the autoclave was cooled, the product filtered, washed and dried at 100° C. X-ray diffraction analysis gave the spectrum shown in FIG. 1 which is similar to that for a typical LTL material except that the peaks are very broad, indicating very small crystals. The n-hexane sorption capacity of this sample was 11.2 wt % (25° C., 51 torr) and the sorption isotherm is shown in FIG. 2. Transmission Electron microscopy (TEM) showed that the crystallites were less than about 150 Å by 200 Å, as shown in FIG. 3, and clearly showing the 12-ring channels.

Figure 4:
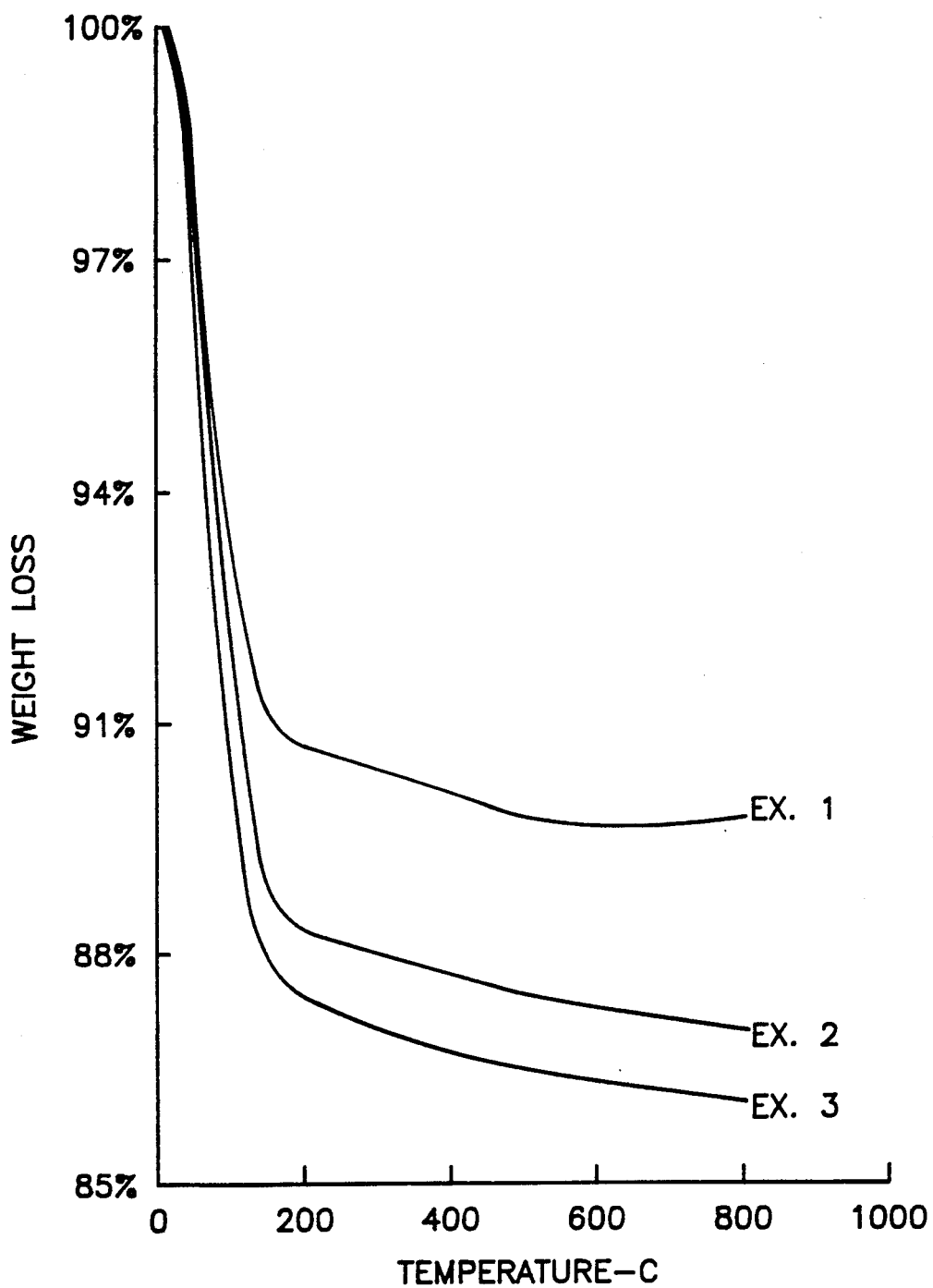
FIG. 4 shows a thermogravimetric analysis of the zeolites made in examples 1, 2, and 3.

Thermogravimetric analysis (FIG. 4) showed a $H_2O+NH_3$ capacity of about 15 wt %.

EXAMPLE 2

A composition:

was made and reacted as for Example 1, except that 2.8 KOH.½$H_2O$ was used in the reaction. The X-ray diffraction pattern after 12 days is shown in FIG. 1, and is now showing increased line broadening, almost amorphous like characteristics. The 5 day reaction sample showed a similar spectrum. Thermogravimetric analysis showed a $H_2O+NH_3$ capacity of 19 wt % (FIG. 4), and TEM showed crystallites having dimensions 50 Å by 80 Å. Infrared analyses gave spectra characteristic of zeolite L.

EXAMPLE 3

A composition:

$$4.0K_2O:Al_2O_3:11.4SiO_2:100NH_3:240H_2O$$

was made and reacted as described in Example 1 except that 3.2 gm KOH.½H$_2$O were used in the reaction.

The product X-ray diffraction pattern is shown in FIG. 1, and may be described as characteristic of a near amorphous material. However, the TEM examination shows the material to be highly crystalline, but with crystals having very small dimensions (100 Å by 150 Å). Thermogravimetric analysis showed a H$_2$O+NH$_3$ capacity of about 23 wt % (FIG. 3), and a hexane sorption capacity at 22° C. (50 torr) gave 20 wt % sorption. A 25° C. n-hexane isotherm showed a distinctive micropore capacity of 8-9 wt %, plus a larger meso-pore sorption, characteristic of small pores between colloidal particles.

EXAMPLE 4

A composition:

$$5K_2O:Al_2O_3:11.4SiO_2:100NH_3:240H_2O$$

was made and reacted in the manner described in Example 1, except that 4 gms of KOH.½H$_2$O were used. The product was essentially similar to that made and described in Example 3 (FIG. 1).

EXAMPLE 5

A composition:

$$6K_2O:Al_2O_3:11.4SiO_2:100NH_3:240H_2O$$

was made and reacted as described in Example 1 except that 4.8 gms KOH.½H$_2$O were used. The product was essentially identical to that described in Example 3 (FIG. 1).

What is claimed is:

1. A process for preparing the synthetic nano-crystalline zeolite isostructural with LTL characterized by having a composition, in terms of mole ratios of oxides, in the range:

$$0.9 \text{ to } 1.1 M_{2/n}O:(Al,Ga,Fe)_2O_3:2.5 \text{ to } 7.0 SiO_2:x(H_2O,NH_3)$$

wherein M represents at least one exchangeable cation of a metal selected from Group I through VIII of the Periodic Table, n represents the valence of M, and x may be 0 or a number from 1 to about 12, which comprises:

(a) preparing a reaction mixture comprising water, a source of silica, a source of alumina, KOH and up to about 30 mole percent of NaOH based on total moles of KOH and NaOH, ammonia, said reaction mixture having a composition, in terms of mole ratios of oxides, within the following ranges:

| | |
|---|---|
| M$_2$'O:(Al,Ga,Fe)$_2$O$_3$ | 2 to 8 |
| SiO$_2$:(Al,Ga,Fe)$_2$O$_3$ | 4 to 20 |
| H$_2$O:(Al,Ga,Fe)$_2$O$_3$ | 80 to 400 |
| NH$_3$:(Al,Ga,Fe)$_2$O$_3$ | 30 to 150 |
| Fe/(Al,Ga,Fe) | 0 to 0.30 | where M' is either K or a mixture of K and Na; and (b) maintaining the reaction mixture at between about 70° C. and 160° C. under autogenous pressure for a sufficient period of time to form crystals of the zeolite product having a mean diameter less than 30 nanometers;

(c) separating said product from the mother liquor; and (d) exchanging said product with exchangable cations of groups 1 through 8 of the Periodic Table.

2. The process of claim 1 wherein during step (b) the reaction mixture is stirred at a rate less than 60 rpm to maintain substantial homogeneity thereof.

3. The process of claim 1 wherein the crystalline zeolite product has a composition in the range:

$$0.9 \text{ to } 1.1 K_2O:Al_2O_3:2.8 \text{ to } 4.8 SiO_2$$

4. The process of claim 1 wherein the source of silica and alumina is a partly dried silica-alumina gel.

5. The process of claim 1 wherein the reaction mixture is maintained between 90° C. and 110° C.

6. The process of claim 5 wherein the reaction mixture is maintained between said temperatures for 2-8 days.

* * * * *